US009823128B2

(12) United States Patent
Pau et al.

(10) Patent No.: US 9,823,128 B2
(45) Date of Patent: Nov. 21, 2017

(54) MULTISPECTRAL IMAGING BASED ON COMPUTATIONAL IMAGING AND A NARROW-BAND ABSORPTIVE FILTER ARRAY

(71) Applicant: THE ARIZONA BOARD OF REGENTS on behalf of THE UNIVERSITY OF ARIZONA, Tucson, AZ (US)

(72) Inventors: Stanley Pau, Tucson, AZ (US); Amit Ashok, Tucson, AZ (US)

(73) Assignee: Arizona Board of Regents on behalf of the University of Arizona, Tucson, AZ (US)

( * ) Notice: Subject to any disclaimer, the term of this patent is extended or adjusted under 35 U.S.C. 154(b) by 71 days.

(21) Appl. No.: 15/027,501

(22) PCT Filed: Oct. 16, 2014

(86) PCT No.: PCT/US2014/060826
§ 371 (c)(1),
(2) Date: Apr. 6, 2016

(87) PCT Pub. No.: WO2015/057922
PCT Pub. Date: Apr. 23, 2015

(65) Prior Publication Data
US 2016/0245698 A1 Aug. 25, 2016

Related U.S. Application Data

(60) Provisional application No. 61/891,840, filed on Oct. 16, 2013.

(51) Int. Cl.
*G01N 21/25* (2006.01)
*G01J 3/28* (2006.01)
(Continued)

(52) U.S. Cl.
CPC ............... *G01J 3/2823* (2013.01); *G01J 3/28* (2013.01); *G01J 3/2803* (2013.01); *G01J 3/36* (2013.01);
(Continued)

(58) Field of Classification Search
CPC ........ G01J 3/28; G01J 3/45; G01J 3/36; G01J 3/51; G01J 3/02; G01J 3/46
See application file for complete search history.

(56) References Cited

U.S. PATENT DOCUMENTS 6,433,844 B2 * 8/2002 Li ............................. G01J 3/14
257/E31.128
7,012,643 B2 3/2006 Frame
(Continued)

FOREIGN PATENT DOCUMENTS

WO    WO 2013/010272    1/2013

OTHER PUBLICATIONS

"Aptina's Clarity+™ Solution. An Aptina™ Technology White Paper," *Aptina Imaging Corporation*, 30 pages, 2013.
(Continued)

*Primary Examiner* — Abdullahi Nur
(74) *Attorney, Agent, or Firm* — Klarquist Sparkman, LLP (57) ABSTRACT

Multispectral imaging systems are disclosed. An exemplary multispectral imager includes a narrow-band absorptive filter array and a sensor array comprising a plurality of pixels. The narrow-band absorptive filter array has a plurality of filter elements, each filter element being associated with a pixel of the sensor array. The filter elements are organized into groups of N filter elements, where N is greater than three. Each filter element absorbs one narrow band and transmits N−1 narrow bands. The group of N filter elements absorbs all N narrow bands.

20 Claims, 8 Drawing Sheets

(51) Int. Cl.
  *G01J 3/51* (2006.01)
  *G01J 3/36* (2006.01)
  *G01J 3/45* (2006.01)

(52) U.S. Cl.
  CPC .............. *G01J 3/45* (2013.01); *G01J 3/513* (2013.01); *G01J 2003/2806* (2013.01); *G01J 2003/2826* (2013.01)

(56) References Cited

U.S. PATENT DOCUMENTS

| | | | |
|---|---|---|---|
| 7,737,391 | B2 | 6/2010 | Hsu et al. |
| 7,880,785 | B2 | 2/2011 | Gallagher |
| 8,125,546 | B2 | 2/2012 | Adams, Jr. et al. |
| 2002/0081013 | A1 | 6/2002 | Raz |
| 2010/0140461 | A1 | 6/2010 | Sprigle et al. |
| 2010/0295947 | A1 | 11/2010 | Boulanger |
| 2011/0309237 | A1 | 12/2011 | Seo et al. |
| 2012/0105783 | A1 | 5/2012 | Pau et al. |
| 2013/0077958 | A1 | 3/2013 | Xu et al. |

OTHER PUBLICATIONS

"Bayer filter," Wikipedia, the free encyclopedia, 6 pages, downloaded from http://en.wikipedia.org//wiki/Bayer_filter on Oct. 1, 2013.
"Color CCD Imaging with RGB and CMY Filters," pp. 1-7, downloaded from http://kellysky.net/artdraf7.htm on Sep. 10, 2014.
"Color filter array," Wikipedia, the free encyclopedia, 5 pages, downloaded from http://en.wikipedia.org//wiki/Color_filter_array on Oct. 1, 2013.
"CYGM filter," Wikipedia, the free encyclopedia, 3 pages, downloaded from http://en.wikipedia.org//wiki/CYGM_filter on Sep. 10, 2014.
"Demosaicing," Wikipedia, the free encyclopedia, 4 pages, downloaded from http://en.wikipedia.org//wiki/Demosaicing on Oct. 1, 2013.
"Multispectral image," Wikipedia, the free encyclopedia, 3 pages, downloaded from http://en.wikipedia.org//wiki/Multispectral_image on Sep. 10, 2014.
"Visible spectrum," Wikipedia, the free encyclopedia, 5 pages, downloaded from http://en.wikipedia.org//wiki/Visible_spectrum on Oct. 1, 2013.
Heim et al., "Low-Light-Level EMCCD Color Camera," Proc. of SPIE, vol. 6209, 11 pages, 2006.
Myhre et al., "Patterned color liquid crystal polymer polarizers," *Optics Express*, vol. 18, No. 26, 10 pages, 2010.
Noble, Stephen A., "The Technology Inside the New *Kodak Professional* DCS 620x Digital Camera. *High-Quality Images at Extremely High ISO Settings,*" pp. 1-4, downloaded from www.imaging-resource.com/NPICS1/620x_tech_paper_final.doc on Apr. 5, 2016.
Parmar et al., "Selection of Optimal Spectral Sensitivity Functions for Color Filter Arrays," *IEEE Transactions on Image Processing*, vol. 19, No. 12, 2010.
Yokogawa et al., "Plasmonic Color Filters for CMOS Image Sensor Applications," *Nano Letters*, vol. 12, pp. 4349-4354, 2012.
Written Opinion of the International Searching Authority, dated Feb. 2, 2015, issued in PCT Patent Application No. PCT/US2014/060826.
International Search Report, dated Feb. 2, 2015, issued in PCT Patent Application No. PCT/US2014/060826.

\* cited by examiner

MULTISPECTRAL IMAGING BASED ON COMPUTATIONAL IMAGING AND A NARROW-BAND ABSORPTIVE FILTER ARRAY

CROSS REFERENCE TO RELATED APPLICATIONS

This application is the §371 U.S. National Stage of International Application No. PCT/US2014/060826, filed Oct. 16, 2014, which was published in English under PCT Article 21(2), which in turn claims priority to and the benefit of U.S. Provisional Application No. 61/891,840, filed Oct. 16, 2013, which is incorporated herein by reference in its entirety.

FIELD

The disclosure relates to, inter alia, multispectral imaging and specifically to improving light sensitivity in multispectral imagers.

BACKGROUND

A multispectral image includes image data at specific frequencies within a given frequency spectrum. One example of a multispectral image is a color image including image data for the red, blue, and green colors within the visible spectrum. Multispectral image systems, such as digital color imagers used in smartphones and digital cameras, can be used to capture multispectral images. A typical multispectral image system includes a pixel array for sensing the intensity of incoming light and a filter array for limiting the light hitting an individual pixel to a given frequency range. For example, a digital camera includes a color filter array having three color filter elements.

The most common configuration of the color filter array is the Bayer filter mosaic where three color filter elements are arranged in groups of four as 2×2 grids across the array. Each color filter element transmits light of one color and absorbs light outside the selected color spectrum. Within the group of four filter elements, one filter element transmits red light, one transmits blue light, and two transmit green light. Thus, only about 50% of the green light, 25% of the blue light, and 25% of the red light make it through the filter and can contribute to the signal reaching the pixel.

Further, the trend in imagers is for the imager to be smaller and provide higher resolution. As a result, the pixels in the pixel array continue to shrink, and their low-light performance continues to degrade due to low light transmission and relatively higher pixel noise. Thus, there is a need for a multispectral imager that can transmit more light through its filter array to improve its low-light sensitivity.

SUMMARY

Accordingly, various embodiments are disclosed herein related to multispectral imaging systems. In an example multispectral imager for sensing a multispectral image, the multispectral imager comprises a light sensor array and a filter array. The light sensor array comprises a plurality of pixels. The filter array is situated upstream of the light sensor array. The filter array comprises a plurality of narrow-band absorptive filter elements in which individual filter elements are associated with respective individual pixels of the light sensor array. The plural filter elements are organized into groups comprising respective N filter elements, where N is greater than three. Individual filter element i absorbs $K_i$ respective narrow bands and transmits $N-K_i$ narrow bands of incident light. $K_i$ is between 1 and N−1, i is from 1 to N, and $K_i$ is different for at least two individual filter elements. The group of N filter elements absorbs the N narrow bands. The respective absorption peaks of the N filter elements can be within an infrared spectrum, such as a range of 900 nanometers to 1700 nanometers, for example. Additionally or alternatively, at least one absorption peak of the N filter elements can be within a visible or ultraviolet spectrum. One or more of the N filter elements can include an interference-type filter. One or more of the N filter elements can include a color dye in a polymer matrix.

In another example multispectral imager for sensing a multispectral image, the multispectral imager comprises a light sensor array and a filter array. The light sensor array comprises a plurality of pixels. The filter array is situated upstream of the light sensor array. The filter array comprises a plurality of narrow-band absorptive filter elements in which individual filter elements are associated with respective individual pixels of the light sensor array. The plurality of filter elements are organized into groups comprising respective N filter elements, where N is greater than three. Individual filter elements absorb one respective narrow band and transmit N−1 narrow bands of incident light. The group of N filter elements absorbs the N narrow bands. An overlap integral for the absorbed narrow bands of any two filter elements of the group of N filter elements can be less than 0.1. An overlap integral for the absorbed narrow bands of any two filter elements of the group of N filter elements can be less than 0.2. A respective absorption peak of each of the N filter elements can be within a spectrum of interest, and a sum of full widths at half maxima for the N filter elements can be less than a range of the spectrum of interest. The N narrow bands corresponding to the full widths at half maxima for the respective N filter elements can be non-overlapping. The respective absorption peaks of the N filter elements can be within a range of 900 nanometers to 1700 nanometers. Alternatively, at least one absorption peak of the N filter elements can be within a visible or ultraviolet spectrum. One or more of the N filter elements can include an interference-type filter. One or more of the N filter elements can include a color dye in a polymer matrix.

In an example method for detecting a multispectral image, the method comprises directing light toward an array of filter elements and an array of light sensors. The array of filter elements is organized into a plurality of groups of filter elements. Each group of filter elements comprises respective N filter elements in which individual filter elements are associated with a respective light sensor of the array of light sensors. N is greater than three. The light entering the array of light sensors is filtered to an image spectrum comprising N narrow bands of spectra. At individual filter elements, one respective narrow band of the spectrum is absorbed and N−1 respective narrow bands of the spectrum are transmitted such that the group of filter elements absorbs respective N narrow bands of the image spectrum. The respective intensity of light received at each light sensor is detected. An overlap integral for the absorbed narrow bands of any two filter elements of the group of N filter elements can be less than 0.1. An overlap integral for the absorbed narrow bands of any two filter elements of the group of N filter elements can be less than 0.2. A respective absorption peak of each of the N filter elements can be within a spectrum of interest, and a sum of full widths at half maxima for the N filter elements can be less than a range of the spectrum of interest. The N narrow bands corresponding to the full widths at half maxima for the respective N filter elements can be non-overlapping. The method can comprise calculating, using an interpolation algorithm, intensity of respective narrow bands of spectra reaching the light sensors associated with the groups of filter elements.

In an example camera, the camera comprises a focusing system, a light sensor array, and a filter array. The focusing system is situated and configured to produce a focused image from light incident to the focusing system. The light sensor array comprises a plurality of light-sensitive pixels. The filter array is situated between the focusing system and the light sensor array. The filter array comprises a plurality of narrow-band absorptive filter elements in which individual filter elements are associated with respective individual pixels of the light sensor array. The plurality of filter elements are organized into groups comprising respective N filter elements, where N is greater than three. Individual filter elements absorb K respective narrow bands and transmit N−K narrow bands of incident light, where K is between one and N−2. The group of N filter elements absorb all N narrow bands of incident light. The group of N filter elements can include a first filter element that absorbs a first number of narrow bands and a second element that absorbs a second number of narrow bands. The absorption peaks of the N filter elements can include at least one absorption peak within a visible spectrum, at least one absorption peak within an ultraviolet spectrum, and/or at least one absorption peak within an infrared spectrum. Each of the N narrow bands corresponding to the full widths at half maxima for the respective N filter elements can be less than 2/N of a spectrum of interest. The group of N filter elements can comprise a first filter element including a color dye in a polymer matrix and a second filter element including an interference-type filter.

The foregoing and other objects, features, and advantages of the invention will become more apparent from the following detailed description, which proceeds with reference to the accompanying figures.

DETAILED DESCRIPTION

As described above, it is desirable to improve the low-light sensitivity of a multispectral imaging system. For example, only about 50% of the green light, 25% of the blue light, and 25% of the red light make it through a Bayer filter mosaic of a conventional multispectral imaging system. As described herein, a multispectral imager for sensing a multispectral image may filter less light and improve the low-light sensitivity and the signal-to-noise ratio (SNR) of a multispectral imaging system. The multispectral imager comprises a narrow-band absorptive filter array and a light sensor array comprising a plurality of pixels. The narrow-band absorptive filter array can comprise multiple optical filter elements for distinguishing between different bands of spectrum. For example, the narrow-band absorptive filter array can comprise N optical filter elements for distinguishing between N different bands of spectrum.

An optical filter is a device that can selectively transmit light at different wavelengths. Parameters of the filter that can be adjusted include the transmission, reflection, and absorption for different wavelengths and polarizations of light. For example, a filter can have 90% transmission, 5% reflection, and 5% absorption at a wavelength of 685 nanometers (nm) for all polarizations of light at normal incidence and 5% transmission, 5% reflection, and 90% absorption at a wavelength of 450 nm for all polarizations of light at normal incidence. An optical filter can be made of a planar transparent substrate and layer of absorbing or reflecting materials. The materials can be metal, dye, polymer and/or layers of dielectric such as oxide, semiconductor and glass. Depending on the materials, the transmission properties of the optical filter can be polarization dependent. Linear, circular, and elliptical color polarizers are types of optical filters where the transmission, absorption, and reflection of light depend not only on wavelength but also on the polarization of incident light. Optical filters such as color polarizers can be made of anisotropic materials such as liquid crystal polymer, dichroic dye, and rod-like nanoparticles.

A conventional image capture system with a conventional filter array can directly measure light within a specific band or range of wavelengths. Each filter element of the conventional filter array can transmit light of one band and absorb light outside the selected band. For example, a conventional color filter array can include red, blue, and green filters for transmitting red, blue, and green light, respectively. Specifically, the red filter can transmit one band of light (red) and absorb two bands of light (blue and green); the blue filter can transmit one band of light (blue) and absorb two bands of light (red and green); and the green filter can transmit one band of light (green) and absorb two bands of light (blue and red). Thus, the light transmitted through a respective conventional filter element and striking its corresponding sensor element is within a single band of light.

In contrast, a narrow-band absorptive filter element transmits light from multiple bands and can absorb light from within one or more narrow bands. For example, a spectrum of interest can be divided up into N narrow bands, and a respective narrow-band absorptive filter can transmit light from N−1 narrow bands and absorb light from one narrow band. As another example, a respective narrow-band absorptive filter can transmit light from N−K narrow bands and absorb light from K narrow bands, where K is between one and N−2. Thus, at least two narrow bands are transmitted through the respective narrow-band absorptive filter. The percentage of total light transmitted through the narrow-band absorptive filter array can potentially be greater than the total light transmitted by a conventional color filter array by having at least two narrow bands transmitted through the respective narrow-band absorptive filter elements.

A narrow-band absorptive filter element can be further defined in at least two ways. First, a narrow-band absorptive filter element can be defined by an amount of overlap of absorbed spectrum of other narrow-band absorptive filter elements. Second a narrow-band absorptive filter element can be defined by characteristics of the absorption bands as measured at the full width at half maximum (FWHM) or ±1 standard deviation of the filter absorption peak.

A narrow-band absorptive filter element can be defined by an absorption peak centered at $\lambda_{filter}$ and an amount of overlap of absorbed spectrum with other narrow-band absorptive filter elements. For example, an optical filter array can include multiple narrow-band absorptive filter elements, where respective filter elements have different absorption bands. The amount of overlap of absorbed spectrum between two absorption bands of respective narrow-band absorptive filter elements can be calculated from an overlap integral of the form:

$$O_{12} = \frac{\int_{\lambda_{min}}^{\lambda_{max}} (\alpha_1(\lambda)\alpha_2(\lambda)\,d\lambda)}{\int_{\lambda_{min}}^{\lambda_{max}} (\alpha_1(\lambda)\,d\lambda) \int_{\lambda_{min}}^{\lambda_{max}} (\alpha_2(\lambda)\,d\lambda)}$$

where $\lambda_{max}$ and $\lambda_{min}$ are the maximum and minimum wavelength of interest, and $\alpha_1$ and $\alpha_2$ are the absorption coefficients of band 1 and band 2, respectively, as a function of wavelength $\lambda$. The spectrum of interest is the spectrum with wavelengths from $\lambda_{min}$ to $\lambda_{max}$ and the range of the spectrum of interest is $\lambda_{max}-\lambda_{min}$.

The value for $O_{12}$ can vary from zero (such as for no overlap between the absorption bands) to one (such as for complete overlap of the absorption bands). In practical multi-band filters, there exists a finite overlap between the different bands. In one embodiment, a narrow-band absorptive filter element can be defined as a filter where $O_{12}<0.1$ for any two narrow-band absorptive filter elements of the N narrow-band absorptive filter elements. In an alternative embodiment, a narrow-band absorptive filter element can be defined as a filter where $O_{12}<0.2$ for any two narrow-band absorptive filter elements of the N narrow-band absorptive filter elements. On the other hand, an absorptive filter element is not narrow-band and the peaks can be considered to be highly overlapping for $O_{12}>0.8$.

A narrow-band absorptive filter element can be defined by an absorption peak centered at $\lambda_{filter}$ and a filter bandwidth $\Delta\lambda_{filter}$, where $\lambda_{filter}$ is the peak of the filter absorption, and $\Delta\lambda_{filter}$ can be the full width at half maximum (FWHM) or ±1 standard deviation of the filter absorption peak. For example, the wavelength ranges of red, green, and blue colors are approximately 620-750 nm, 495-570 nm and 450-495 nm, respectively. A narrow-band color filter for red, green, and blue can have center wavelengths $\lambda_{filter}$ of 685 nm, 532.5 nm, and 472.5 nm, respectively, and bandwidths $\Delta\lambda_{filter}$ of 45 nm, 75 nm, and 130 nm, respectively. In one embodiment, narrow-band absorptive filter elements can be defined as filter elements having non-overlapping absorption bands as measured at the full widths at half maxima of the filter absorption peaks. In one embodiment (as described further with reference to FIG. 3A), a narrow band can be defined as a range of spectrum that is about 1/N of the range of the spectrum of interest, where N is the number of frequency components to distinguish within the spectrum of interest. For example, an absorption peak of each of the N filter elements can be within the spectrum of interest, and a sum of full widths at half maxima for the N filter elements can be less than the spectrum of interest.

Figure 1:
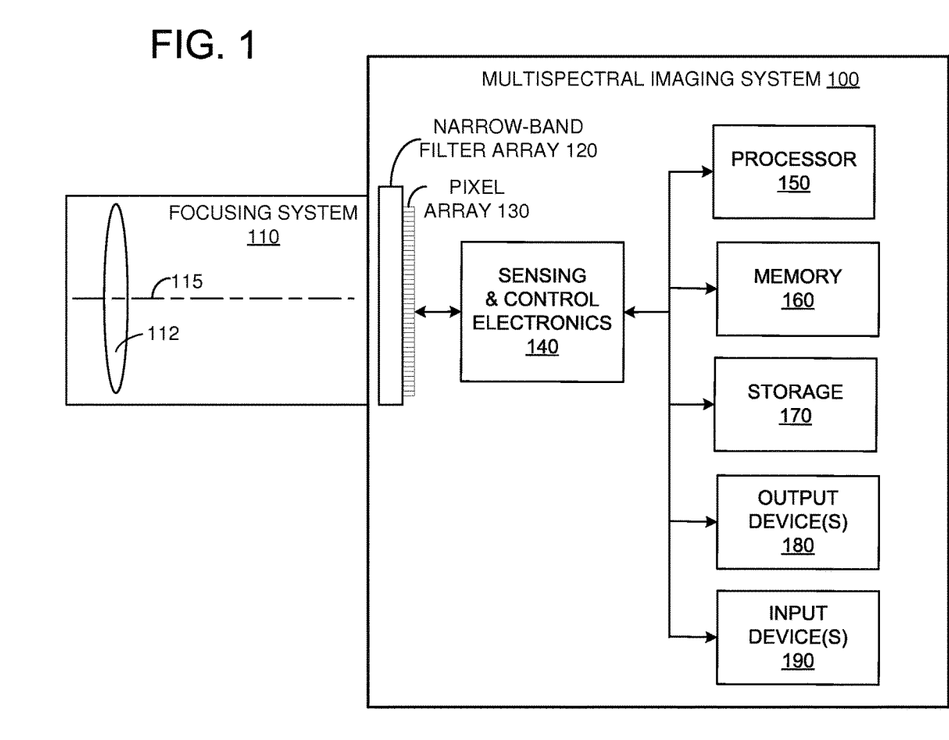
FIG. 1 is a block diagram of a multispectral imaging system for producing a multispectral image.

Turning to the figures, FIG. 1 is a block diagram of an embodiment of a multispectral imaging system 100 for sensing a multispectral image. For example, the multispectral imaging system 100 can be a still camera or video camera. The multispectral imaging system 100 comprises a focusing system 110, a narrow-band filter array 120, and a pixel array 130.

The focusing system 110 focuses incident light through the narrow-band filter array 120 and onto the pixel array 130. Thus, the narrow-band filter array 120 is in the optical path between the focusing system 110 and the pixel array 130. In other words, the narrow-band filter array 120 is upstream (e.g., closer to the light source) of the pixel array 130. The incident light may include electromagnetic radiation of any wavelength and the focusing system 110 is capable of focusing light having wavelengths within the spectrum of interest. The focusing system 110 may include one or more of lenses (such as imaging lens 112), mirrors, optical splitters, a shutter, or optical filters as are known in the art to form a multispectral image onto the pixel array 130. The lens 112 can be fixed or adjustable to focus an image along the optical axis 115, through the narrow-band filter array 120, and onto the pixel array 130. By adjusting the lens 112, objects that are different distances from the multispectral imaging system 100 can be focused onto the pixel array 130. The lens 112 can be an achromatic lens designed to operate at both visible and infrared wavelengths. Alternatively, for example, the lens 112 (and the focusing system 110) can be configured to provide an image in the visible spectrum during the day, and an image in the infrared spectrum at night.

The narrow-band filter array 120 comprises an array of filter elements that are further organized into groups. Each filter element is associated with a respective pixel of the pixel array 130. Generally, each filter element absorbs light in one or more narrow bands of spectrum within a spectrum of interest. The narrow-band filter array 120 is described in more detail below. The multispectral imaging system 100 can include one or more additional filters, such as filters for limiting the light reaching the pixel array 130 to a spectrum of interest. The pixel array 130 comprises an array of light sensors or pixel elements, where each pixel element measures the intensity of light reaching the pixel and converts the intensity of light incident on the pixel into a corresponding electronic signal. In one embodiment, the pixel may be a charge-coupled device (CCD). In an alternative embodiment, the pixel may be a complementary metal-oxide-semiconductor (CMOS) photo-detector. The pixel array 130 is described in more detail below with reference to FIG. 2.

The multispectral imaging system 100 can comprise sensing and control electronics 140, a processor 150, memory 160, and storage 170. Sensing and control electronics 140 are used for capturing image data from the pixel array 130. For example, sensing and control electronics 140 may control a frame rate at which images are captured from the pixel array 130. In one embodiment, video can be captured at around twenty-four frames per second or higher. Sensing and control electronics 140 may include amplifiers and analog-to-digital converters for converting the charge from a pixel into a digital value for each pixel. Sensing and control electronics 140 may store pixel values in memory 160 or storage 170, or may communicate pixel values to the processor 150.

The processor 150 may control one or more functions of the multispectral imaging system 100. For example, the processor 150 may control the capturing of image data from the pixel array 130 and perform calculations on the image data. The processor 150 may perform calculations to determine the average intensity of a color for a group of pixel elements, as described below with reference to FIGS. 3-6. The processor 150 may perform instructions to process image data, such as interpolating a pixel value based on neighboring pixel values. The processor 150 can read from and write to the memory 160 and storage 170. The processor 150 may communicate with the pixel array 130 via sensing and control electronics 140, the memory 160, or the storage 170.

The memory 160 can store instructions for the processor 150, pixel data from the pixel array 130, and processed pixel data. The memory 160 can include volatile and/or non-volatile memory such as one or more of read-only-memory, FLASH memory, and random access memory (static or dynamic), for example. The storage 170 can include removable and/or non-removable storage, such as magnetic disks, direct-attached storage, network-attached storage (NAS), storage area networks (SAN), redundant arrays of independent disks (RAID), magnetic tapes or cassettes, CD-ROMs, DVDs, or any other medium which can be used to store information in a non-transitory way and which can be accessed by the processor 150.

The memory 160 and storage 170 are computer-readable storage media. The term "computer-readable storage media" does not include communication connections, such as signals and carrier waves. Any of the computer-executable instructions for implementing the disclosed methods as well as any data created and used during implementation of the disclosed embodiments can be stored on one or more computer-readable storage media. It should be understood that any functionality described herein can be performed, at least in part, by one or more hardware logic components, instead of software. For example, and without limitation, illustrative types of hardware logic components that can be used include Field-Programmable Gate Arrays (FPGAs), Application-Specific Integrated Circuits (ASICs), Application-Specific Standard Products (ASSPs), System-On-a-Chip systems (SOCs), and Complex Programmable Logic Devices (CPLDs).

The multispectral imaging system 100 can comprise one or more output device(s) 180 and one or more input device(s) 190. The output device(s) 180 can include a view-finder or display for presenting multispectral images. The output device(s) 180 can include one or more communication connections (such as a USB port, Ethernet, or Wi-Fi) to enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier. The input device(s) 190 can include a power-button, a shutter button, a keyboard, a microphone, a touch-screen, or other device suitable for receiving input from a user or other computing device.

Figure 2:
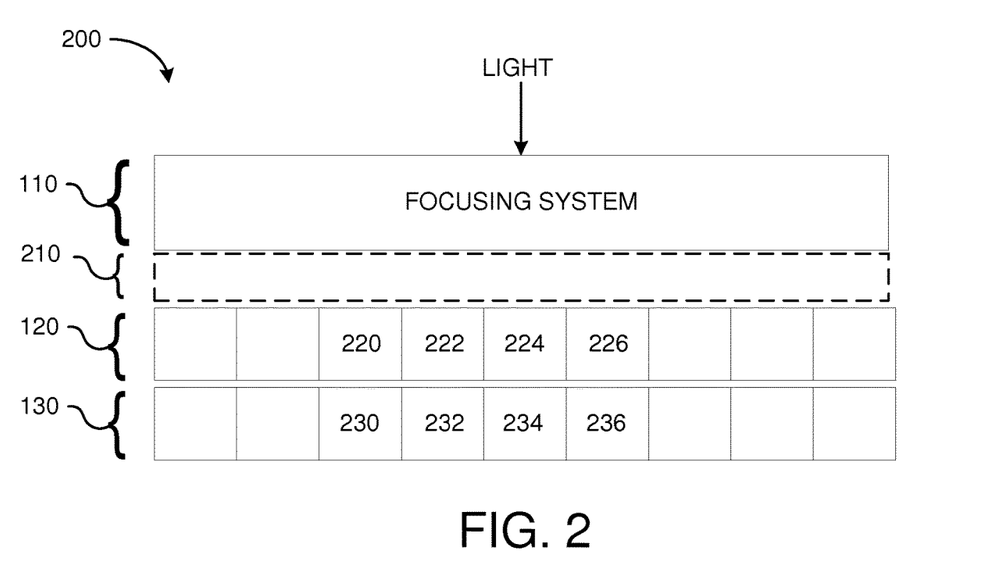
FIG. 2 is a schematic of a cross-sectional view of a system for producing a multispectral image, the system including a narrow-band absorptive filter array.

FIG. 2 is a schematic of a cross-sectional view or a stack-up 200 of a system for capturing a multispectral image, the system including a narrow-band absorptive filter array 120. FIG. 2 is provided for illustrative purposes and is not drawn to proportion or to scale. The focusing system 110 focuses or directs light to the pixel array 130 through the narrow-band filter array 120 and optionally through the transmissive filter 210. The transmissive filter 210 may be used to band-pass filter the spectrum of light reaching the narrow-band filter array 120 and the pixel array 130. In this manner, the spectrum of light captured in the multispectral image can be limited to a desired spectral range (e.g., the spectrum of interest). For example, if it is desired to capture only visible images, the transmissive filter 210 can filter the incoming light to transmit selected colors in the visible spectrum between the wavelengths of about 380 nanometers (nm) and 740 nm and to block wavelengths outside of the visible spectral range. As another example, if it is desired to capture only infrared images, the transmissive filter 210 can filter the incoming light to transmit selected colors in the infrared spectrum between the wavelengths of about 700 nm and 1 millimeter and to block wavelengths outside of the infrared spectral range. By bandpass filtering the light, light outside the spectrum of interest will not be detected by the pixel array 130. While the transmissive filter 210 is illustrated as being located between the focusing system 110 and the narrow-band filter array 120, the transmissive filter 210 may be situated before the focusing system 110 or integrated with the narrow-band filter array 120 in alternative embodiments. The transmissive filter 210 may also be used for blocking ultraviolet light from reaching the narrow-band filter array 120.

It should be understood that the stack-up 200 can include other optical components. For example, an array of micro-lenses (not shown) can be positioned between the transmissive filter 210 and the narrow-band absorptive filter array 120. The array of micro-lenses can include a respective micro-lens associated with and aligned with each pixel of the pixel array 130. The micro-lens can be used to potentially improve light collection at the respective pixel.

The narrow-band filter array 120 further filters the light before the light reaches the pixel array 130. The narrow-band filter array 120 is comprised of filter elements, such as the filter elements 220, 222, 224, and 226. The pixel array 130 is comprised of pixels, such as the pixels 230, 232, 234, and 236. Each filter element substantially covers and is associated with a respective pixel. For example, the filter element 220 is associated with the pixel 230; the filter element 222 is associated with the pixel 232; the filter element 224 is associated with the pixel 234; and the filter element 226 is associated with the pixel 236. In one embodiment, each pixel is sensitive to light at least within the desired spectral range. As described further, each filter element absorbs a narrow spectral band of light. In one embodiment, the filter elements are organized into groups comprising N filter elements, where each of the N filter elements absorbs a different spectral band of light. In this manner, each filter element absorbs one spectral band and its associated pixel receives N−1 spectral bands of light. In an alternative embodiment, the filter elements are organized into groups comprising N filter elements where each of the N filter elements absorbs at least one spectral band of light (e.g., filter element i absorbs $K_i$ bands of light). In this manner, each filter element absorbs K spectral bands, and its associated pixel receives N−K spectral bands of light. The group of filter elements absorbs N narrow bands of the image spectrum. In one embodiment, N is greater than three, and K is between 1 and N−2. In another embodiment, K can vary among the individual filter elements, i, such that N is greater than three and $K_i$ is between 1 and N−1.

For example, a group of filter elements may include four filter elements, such as the filter elements 220, 222, 224, and 226, that absorb light in the visible and the near-infrared spectra. For example, the filter element 220 may absorb red light, the filter element 222 may absorb green light, the filter element 224 may absorb blue light, and the filter element 226 may absorb near-infrared light. Thus, the pixel 230, which is associated with the filter element 220, will not receive red light but will receive green, blue, and infrared light. Similarly, the pixel 232 associated with the filter element 222 will receive infrared, red, and blue light; the pixel 234 associated with the filter element 224 will receive infrared, red, and green light; and the pixel 234 associated with the filter element 224 will receive red, blue, and green light. In this example, about three-fourths of the incident near-infrared light, three-fourths of the incident red light, three-fourths of the incident green light, and three-fourths of the incident blue light reach the pixels associated with the group of filter elements. This can be contrasted with about 50% of the green light, 25% of the blue light, and 25% of the red light reaching the pixels in the conventional Bayer filter configuration having two green-transmissive filter elements, one blue-transmissive filter element, and one red-transmissive filter element. Thus, less light is absorbed by the narrow-band filter array 120 when compared to a Bayer filter array, allowing correspondingly more light to reach the pixels.

In one embodiment, elements of the narrow-band filter array 120 can be fabricated using a combination of single color dyes of narrow absorption spectrum and a transparent polymer. Specifically, the narrow-band filter elements can include a color dye in a thin-film polymer matrix. Mixtures of dye(s) and polymer can be spin-coated and patterned directly on the pixels of the focal-plane array, as described in U.S. patent application Ser. No. 13/287,910, filed on Nov. 2, 2011, which is incorporated herein by reference. Filter elements can be fabricated from a dye that has an absorption band that is within the spectrum of interest. Many of the dyes have a tendency to bleach upon repeated exposure to ultraviolet radiation. Thus, an ultraviolet filter, such as the transmissive filter 210, can be used to prevent such damage. In an alternative embodiment, the color filter can be an interference-type filter and can be realized by using multiple layers of transparent materials of alternating dielectric constants or a cholesteric liquid crystal material. In alternative embodiments, elements of the narrow-band filter array 120 can be fabricated using one or more of a mixture of multiple color dyes, quantum dots, nano-particles, nanowires, and carbon nanotubes. The elements of the narrow-band filter array 120 can be deposited as a thin film by spin-coating, sputtering, spraying, evaporation, imprinting, or inkjet printing.

Figure 3A:
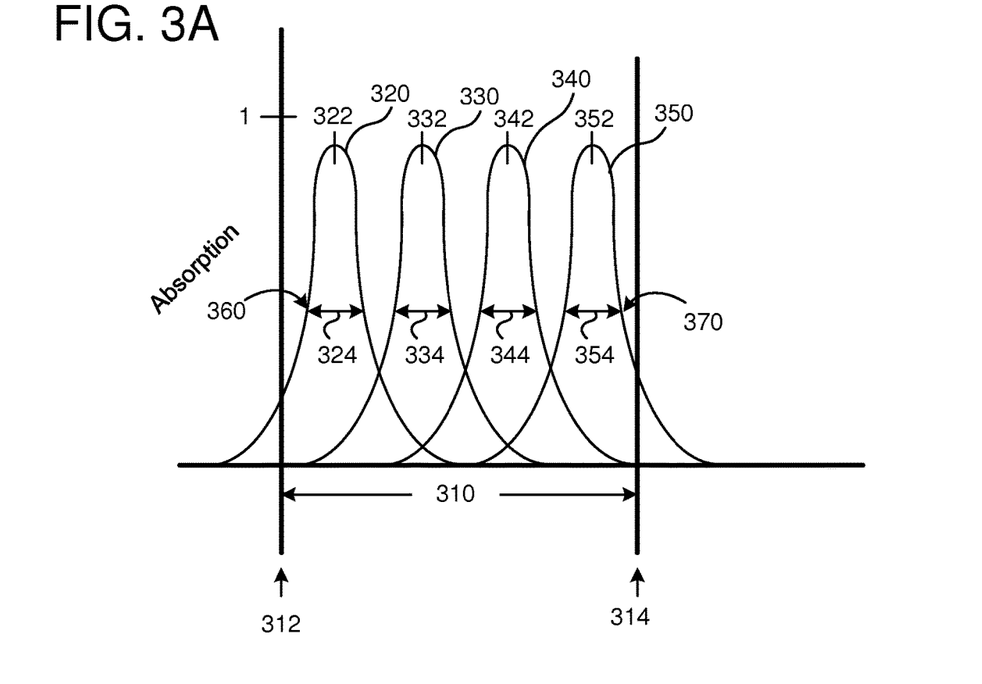
FIGS. 3A-3D depict examples of the absorption spectrum of filter elements within a narrow-band absorptive filter array.

FIGS. 3A-3D illustrate examples of the absorption spectrum of filter elements within the narrow-band absorptive filter array. FIG. 3A illustrates an example of the absorption spectrum of a group of four filter elements that divide a spectrum of interest 310 into four spectral bands. The wavelength of light is mapped along the x-axis, so the spectrum of interest 310 is bounded by the minimum wavelength of interest 312 and the maximum wavelength of interest 314. The spectrum of interest can be defined as the range of wavelengths that are capable of being detected by the pixel array 130. For example, the individual light-sensitive elements of the pixel array 130 can detect light within a first range, such as from about 350 nm to 1000 nm. The first range can be reduced by adding filters, such as transmissive filter 210, between the incident light and the pixel array 130. Similarly, the first range can be reduced by the spectral range that can be transmitted through the focusing system 110.

The normalized absorption of the filter element is mapped along the y-axis. In this example, a first filter element absorbs a first narrow band 320 including a peak absorption at wavelength 322 and a full width at half maximum 324; a second filter element absorbs a second narrow band 330 including a peak absorption at wavelength 332 and a full width at half maximum 334; a third filter element absorbs a third narrow band 340 including a peak absorption at wavelength 342 and a full width at half maximum 344; and a fourth filter element absorbs a fourth narrow band 350 including a peak absorption at wavelength 352 and a full width at half maximum 354. In this manner, the spectrum of interest 310 can be divided into four spectral bands, where each filter element absorbs one respective narrow band and passes three respective narrow bands of the spectrum to its associated pixel. In one embodiment (not shown), the minimum wavelength of interest 312 can be coincident with the minimum wavelength associated with the FWHM 324, and the maximum wavelength of interest 314 can be coincident with the maximum wavelength associated with the FWHM 354.

In one embodiment, a narrow band of the spectrum, $\Delta\lambda_s$, can be defined as a spectral range that is about 1/N of the spectrum of interest, where N is the number of frequency components to distinguish within the spectrum of interest. Thus, the total spectrum can span a range of $N\Delta\lambda_s$, consisting of N narrow-band spectra of width $\Delta\lambda_s$. As one example, a filter element of the narrow-band absorptive filter array, with bandwidth $\Delta\lambda_{filter}$, can absorb less than 1/N of the spectrum of interest 310 as measured at full width at half maximum, or $\Delta\lambda_{filter} < \Delta\lambda_s$. As another example, a filter element of the narrow-band absorptive filter array, with bandwidth $\Delta\lambda_{filter}$, can absorb less than 125% of 1/N of the spectrum of interest 310 as measured at FWHM, or $\Delta\lambda_{filter} < 1.25\Delta\lambda_s$. In yet another example, a filter element of the narrow-band absorptive filter array, with bandwidth $\Delta\lambda_{filter}$, absorbs less than 75% of 1/N of the spectrum of interest 310 as measured at FWHM, or $\Delta\lambda_{filter} < 0.75\Delta\lambda_s$. In yet another example, a filter element of the narrow-band absorptive filter array can absorb between 125% and 75% of 1/N of the spectrum of interest 310 as measured at FWHM. Factors for determining the exact percentage amount may include: (1) the availability and cost of the optical filter, (2) the requirements of the camera, and (3) the desire to increase transmitted light signal to the detector.

In an alternative embodiment, a narrow band of the spectrum can be defined based on the spectrum of interest, the wavelength of the absorption peaks, and the sum of the absorption bandwidths of the absorptive filter elements. For example, the filter elements can be narrow-band filter elements when the absorption peak of each of the N filter elements is within the spectrum of interest 310 and the sum of full widths at half maxima for the N filter elements is less than the spectrum of interest 310. The N narrow bands corresponding to the full widths at half maxima for the respective N filter elements can be overlapping or non-overlapping. For example, in FIG. 3A, the N narrow bands (324, 334, 344, and 354) are non-overlapping, and the sum of the absorbed N narrow bands (measured at the FWHM of the curves) is less than the spectrum of interest 310.

Figure 3B:
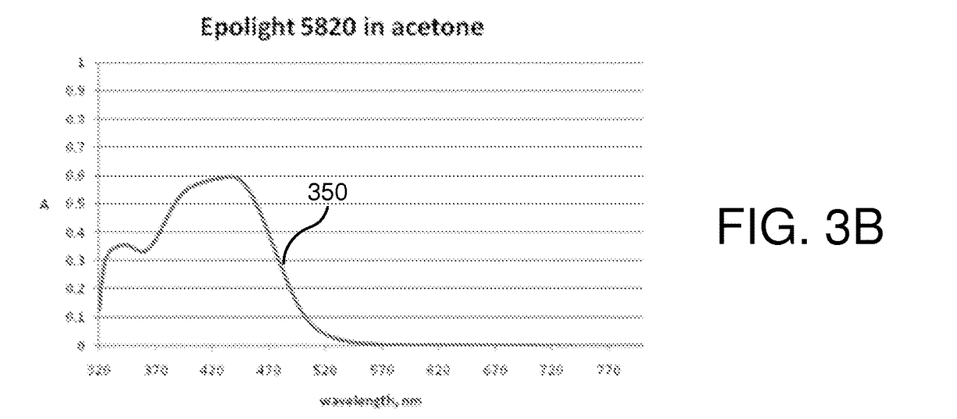
Figure 3C:
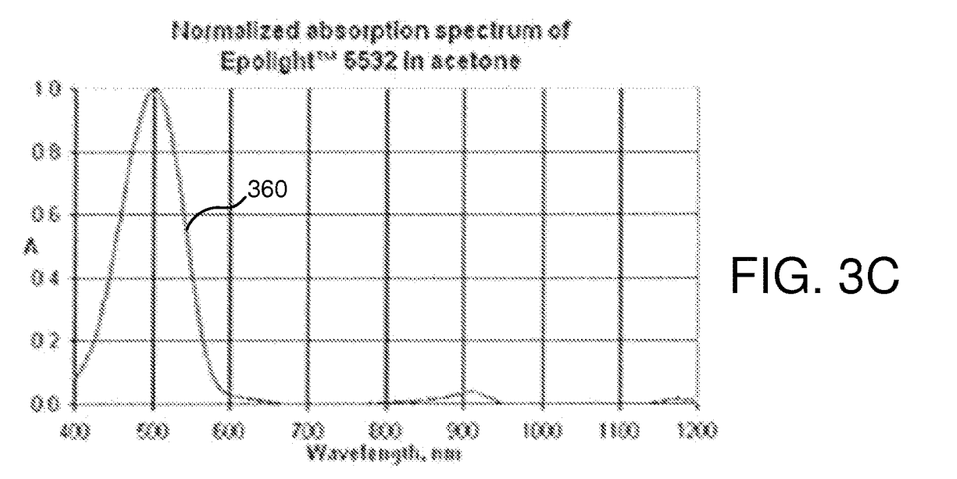

Examples of dyes exhibiting the desired characteristics for narrow-band filtering in the visible spectrum are manufactured by Epolin of Newark, N.J. FIG. 3B illustrates the absorption spectrum 350 of an Epolight™ 5820 dye in acetone. The Epolight™ 5820 dye absorbs blue light centered at about 420 nm with a full width at half maximum of about 120 nm. FIG. 3C illustrates the absorption spectrum

Figure 3D:
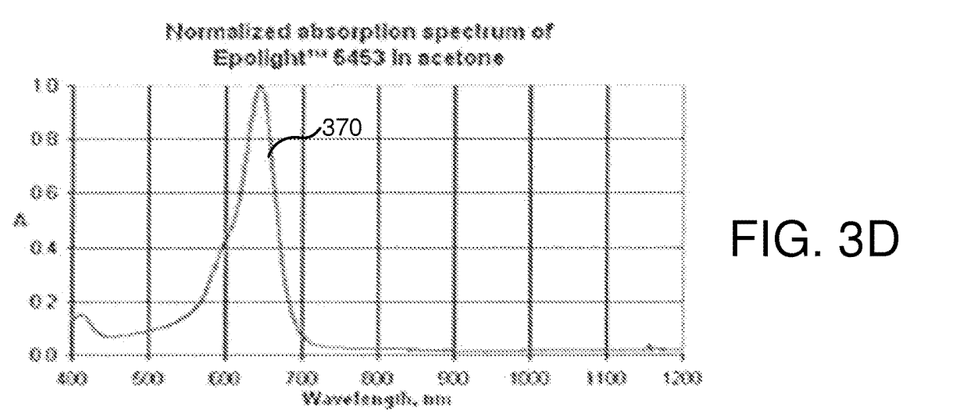

360 of an Epolight™ 5532 dye in acetone. The Epolight™ 5532 dye absorbs green light centered at about 500 nm with a full width at half maximum of about 100 nm. FIG. 3D illustrates the absorption spectrum 370 of an Epolight™ 5453 dye in acetone. The Epolight™ 5453 dye absorbs red light centered at about 644 nm with a full width at half maximum of about 60 nm. A dye-based absorption filter may provide a cost advantage compared to some other types of filters. However, dyes may not be available for all wavelengths within the spectrum of interest 310 for some embodiments. For example, dyes may not be available for wavelengths greater than one micron. For wavelengths greater than one micron, other types of absorptive filters can be used, such as interference-type filters. For a given narrow-band filter array, the narrow-band filter elements can be of mixed types so that the narrow-band filter array can include a dye-based absorption filter and an interference-type filter, for example.

Figure 4:
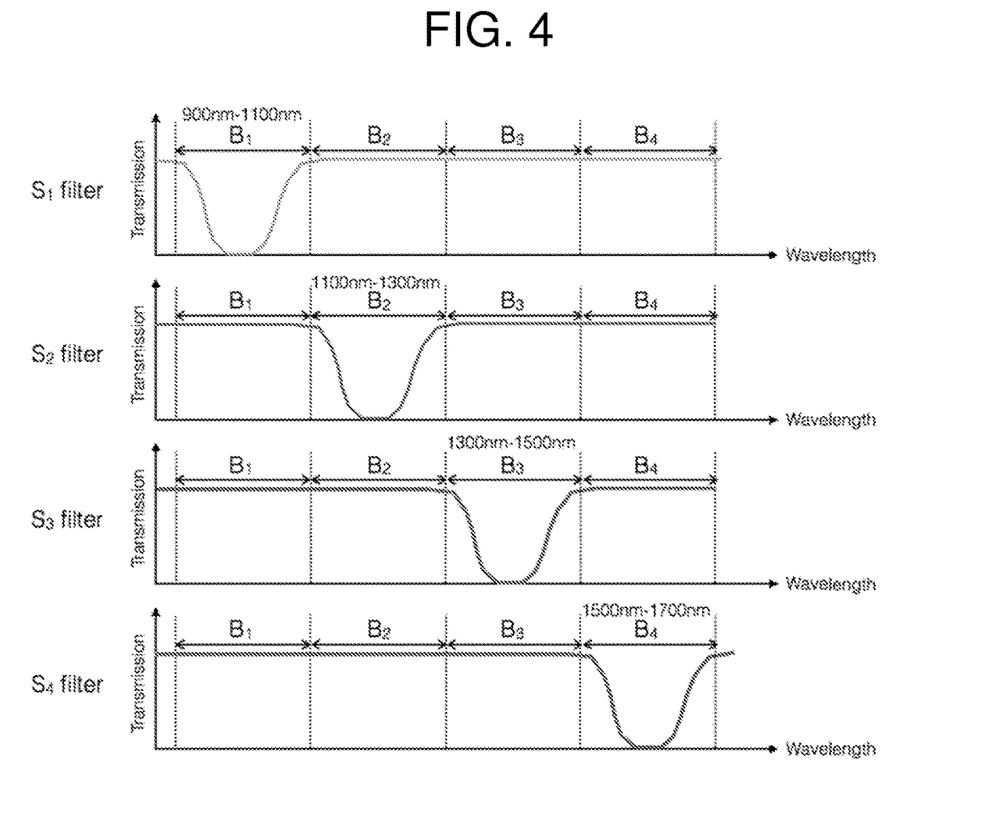
FIG. 4 illustrates another example of the absorption spectrum of filter elements within a narrow-band absorptive filter array.

FIG. 4 illustrates another example of the absorption spectrum of filter elements within a narrow-band absorptive filter array. Specifically, FIG. 4 illustrates an example having a spectrum of interest in the short-wave infrared (SWIR) spectrum between 900 nm and 1700 nm. For example, a SWIR multi-spectral imager can include four non-overlapping absorptive spectral filter elements to measure as many color or spectral bands. Specifically, the multi-spectral imager can include spectral filters $S_1$, $S_2$, $S_3$, and $S_4$ for absorbing incident light in 900-1100 nm, 1100-1300 nm, 1300-1500 nm, and 1500-1700 nm narrow bands respectively. Note that in FIG. 4, the transmission spectrum through the filter elements is illustrated rather than the absorption spectrum (as in FIGS. 3A-3D). Absorption and transmission are related by the equation: transmission+absorption+reflection=1. Thus, for reflections close to zero, transmission is about 1−absorption.

The light transmitted through the respective filter elements and striking the corresponding light-sensitive pixels can be measured as $S_x$, where x is the corresponding filter-pixel pair. Mathematically the four measurements can be expressed as:

$$S_1 = B_2 + B_3 + B_4 + n$$
$$S_2 = B_1 + B_3 + B_4 + n$$
$$S_3 = B_1 + B_2 + B_4 + n$$
$$S_4 = B_1 + B_2 + B_3 + n$$

or $$\overline{S} = T\overline{B} + n$$

or $$\overline{S} = \begin{bmatrix} 0 & 1 & 1 & 1 \\ 1 & 0 & 1 & 1 \\ 1 & 1 & 0 & 1 \\ 1 & 1 & 1 & 0 \end{bmatrix} \overline{B} + n, \overline{S} = \begin{bmatrix} S_1 \\ S_2 \\ S_3 \\ S_4 \end{bmatrix}, \overline{B} = \begin{bmatrix} B_1 \\ B_2 \\ B_3 \\ B_4 \end{bmatrix}$$

where $B_y$ is the light transmitted in the y narrow band, T is the transmission matrix, and n represents the noise in each measurement. Each row of T represents the transmission spectra of its corresponding filter element, so row 1 (the top row) corresponds to the $S_1$ filter element and indicates that narrow band 1 is absorbed (the 0 at $t_{1,1}$) and narrow bands 2-4 are transmitted (the 1's at $t_{1,2}$, $t_{1,3}$, and $t_{1,4}$, respectfully). Each row of T also represents the materials or components of its corresponding filter element, where a 0 indicates that the filter element includes a dye or an interference pattern corresponding to the absorbed narrow band, for example.

The transmitted light in each narrow spectral band (e.g., $B_1$, $B_2$, $B_3$, and $B_4$) for the group of filter elements can be recovered by solving for $\overline{B}$ (e.g., by inverting the 4×4 T matrix) to get:

$$B_1^{estimate} = \frac{[S_2 + S_3 + S_4 - 2S_1]}{3} = B_1 + n\sqrt{\frac{7}{9}}$$

$$B_2^{estimate} = \frac{[S_1 + S_3 + S_4 - 2S_2]}{3} = B_2 + n\sqrt{\frac{7}{9}}$$

$$B_3^{estimate} = \frac{[S_1 + S_2 + S_3 - 2S_3]}{3} = B_3 + n\sqrt{\frac{7}{9}}$$

$$B_4^{estimate} = \frac{[S_1 + S_2 + S_3 - 2S_4]}{3} = B_4 + n\sqrt{\frac{7}{9}}$$

When making the simplifying assumption that each measurement is limited by signal-independent detector noise, with variance $\sigma^2$, the resulting noise variance of the recovered/estimated spectral band can be reduced to $(7/9)\sigma^2$, which is equivalent to a SNR improvement of 29% relative to a traditional overlapping spectral filter design. If three spectral bands are considered instead (e.g., N=3/K=1), the SNR improvement can increase to 33% relative to a conventional overlapping filter design.

Figure 5:
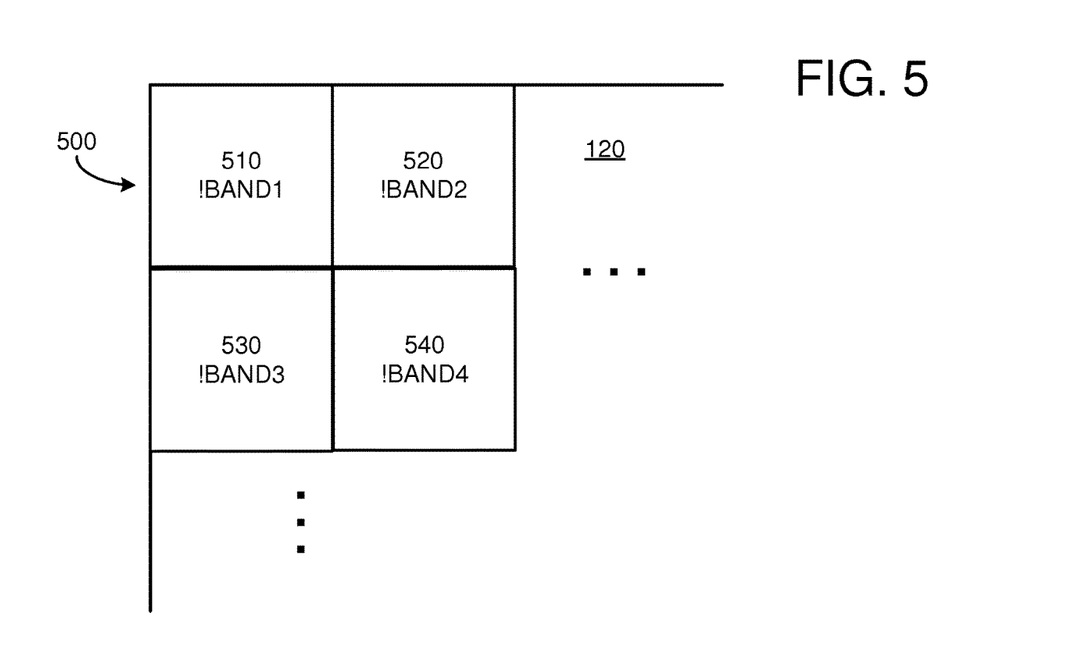
FIG. 5 illustrates one embodiment of a group of four filter elements of a narrow-band absorptive filter array.

FIG. 5 illustrates one embodiment of a group of filter elements 500 of an absorptive narrow-band filter array 120. FIG. 5 illustrates a plane of the narrow-band filter array 120 that is generally perpendicular to the optical axis 115 and the focused light such that the multispectral image is focused over the area of the narrow-band filter array 120 and the pixel array 130. The group of filter elements 500 comprises the filter elements 510, 520, 530, and 540, where respective filter elements absorb a different narrow band of spectrum. Although four filter elements are described, different numbers of filter elements are possible. Four elements may be desirable because the group of filter elements 500 can be repeated across the narrow-band filter array 120 in a regular pattern. For example, multiple groups of filter elements 500 can be arranged in an array across the narrow-band filter array 120. Specifically, if the sensor array 120 includes an array of 1024×1024 pixels and the group of filter elements 500 includes a 2×2 array of filter elements, then the narrow-band filter array 120 can include a 512×512 array of groups of filter elements 500 spatially distributed across the narrow-band filter array 120.

Four elements may also be desirable because the spectrum of interest can be divided into the visible and the near-infrared spectra, where the visible spectrum can be further divided into the red, blue, and green narrow bands. By having narrow-band absorptive filters that are sensitive to both visible and infrared spectra spatially distributed within a single narrow-band filter array 120, a discernable image can potentially be sensed in both daylight and at night-time. For example, it may be desirable for an imager for an autonomous car to detect obstacles in both the day and night. Conventional cameras may allow for sensing visible and infrared light by having a moveable color-wheel filter mounted upstream of the sensor array. The color-wheel includes multiple filters, where each filter transmits light of a desired wavelength. In order to change the wavelengths detected by the sensor array, the color-wheel is rotated or otherwise positioned so that a different filter is upstream of the sensor array. Because a typical color-wheel cannot be aligned within the accuracy of a pixel width, one filter is typically used to cover the entire pixel array so that only a single band of wavelengths can be sampled for the sensor array. If multiple spectral bands of an image are to be discerned by an imager using a color-wheel, the image must be captured over a period of time by taking multiple samples with the color-wheel moved for each sample. Thus, a color-wheel is likely not suitable for images that can change within a time period that is close to the time it takes to move the color wheel to a different band. Further, a color-wheel has moving parts and so it may be less durable and reliable as compared to a monolithic design, such as the narrow-band filter array 120.

The four filter elements in the group of filter elements 500 can be used to detect a multispectral image having four different spectral components. For example, the four elements can absorb a different respective narrow band of spectrum, and the average intensity of light in each narrow band falling on the group of filter elements 500 can be calculated by solving four equations with four unknowns. For example, the filter element 510 can absorb a first narrow band (band1), the filter element 520 can absorb a second narrow band (band2), the filter element 530 can absorb a third narrow band (band3), and the filter element 540 can absorb a fourth narrow band (band4).

In one embodiment, the four filter elements in the group of filter elements 500 can be used to detect a multispectral image having visible and infrared components. The filter element 510 can absorb red light and transmit blue, green, and near-infrared light so that the measured signal at its associated pixel is approximately given by $I_{510}=I_{green}+I_{blue}+I_{near-IR}$. The filter element 520 can absorb green light and transmit blue, red, and near-infrared light so that the measured signal at its associated pixel is approximately given by $I_{520}=I_{red}+I_{blue}+I_{near-IR}$. The filter element 530 can absorb blue light and transmit green, red, and near-infrared light so that the measured signal at its associated pixel is approximately given by $I_{530}=I_{red}+I_{green}+I_{near-IR}$. The filter element 540 can absorb near-infrared light and transmit green, red, and blue light so that the measured signal at its associated pixel is approximately given by $I_{540}=I_{red}+I_{green}+I_{blue}$. The average intensity of light in each narrow band falling on the group of filter elements 400 can be calculated by solving the four equations with four unknowns. Thus, $I_{blue}=(I_{520}+I_{530}+I_{540}-2I_{510})/3$, $I_{green}=(I_{510}+I_{530}+I_{540}-2I_{520})/3$, and $I_{red}=(I_{510}+I_{520}+I_{540}-2I_{530})/3$, and $I_{near-IR}=(I_{510}+I_{520}+I_{530}-2I_{540})/3$ for the group of four adjacent pixels.

Additionally or alternatively, the group of filter elements 500 may comprise additional filter elements, such as a filter element that transmits all wavelengths in the spectrum of interest, e.g., the additional filter element may be clear. The addition of a clear filter element may potentially increase the total light reaching the pixel array 130.

Generalizing, a spectrum of interest can be divided into N narrow spectral bands, where each band has little overlap with the other bands. For example, the amount of overlap can be defined by the overlap integral or by the characteristics of the full widths at half maxima for the narrow bands. The narrow-band filter array 120 is organized into groups of filter elements, where each filter element of the group can absorb one spectral band and transmit N−1 spectral bands. Thus, the amount of light reaching the respective pixel is about (N−1)/N of the light entering the filter array. The average intensity for a narrow-band component can be calculated by solving N equations for N unknowns.

Figure 6:
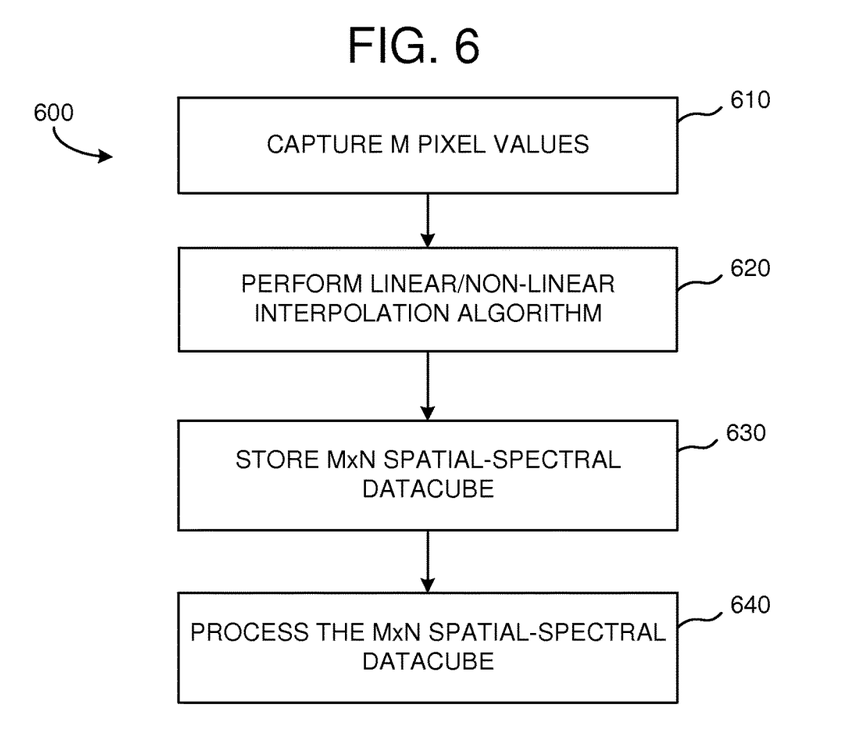
FIG. 6 illustrates an embodiment of a method for processing pixel data.

FIG. 6 depicts an embodiment of a method 600 for processing pixel data. The method 600 may be performed by the processor 150, for example. At 610, the intensity of the light reaching each of the pixels of the pixel array 130 is captured. M pixel values are captured in one frame time. For example, the M pixel values may be equal to the number of rows multiplied by the number of columns of the pixel array 130. At 620, a linear or non-linear interpolation algorithm is used to convert the M pixel values into a M×N spatial spectral datacube. In other words, a respective component for each of the N narrow spectral bands is generated for each of the M pixels. Interpolation is desirable because the subtractive nature of the filter generates a set of spatially under-sampled values for a given narrow band. Thus, this interpolation uses neighboring pixel values to calculate missing spectral components. In one embodiment, the average intensity for each narrow-band component of a group of pixels is calculated prior to interpolation. At 630, the M×N values are stored, such as in the memory 160 or the storage 170. Subsequent processing of the M×N data, 640, may include data compression, image processing, and noise reduction.

Figure 7:
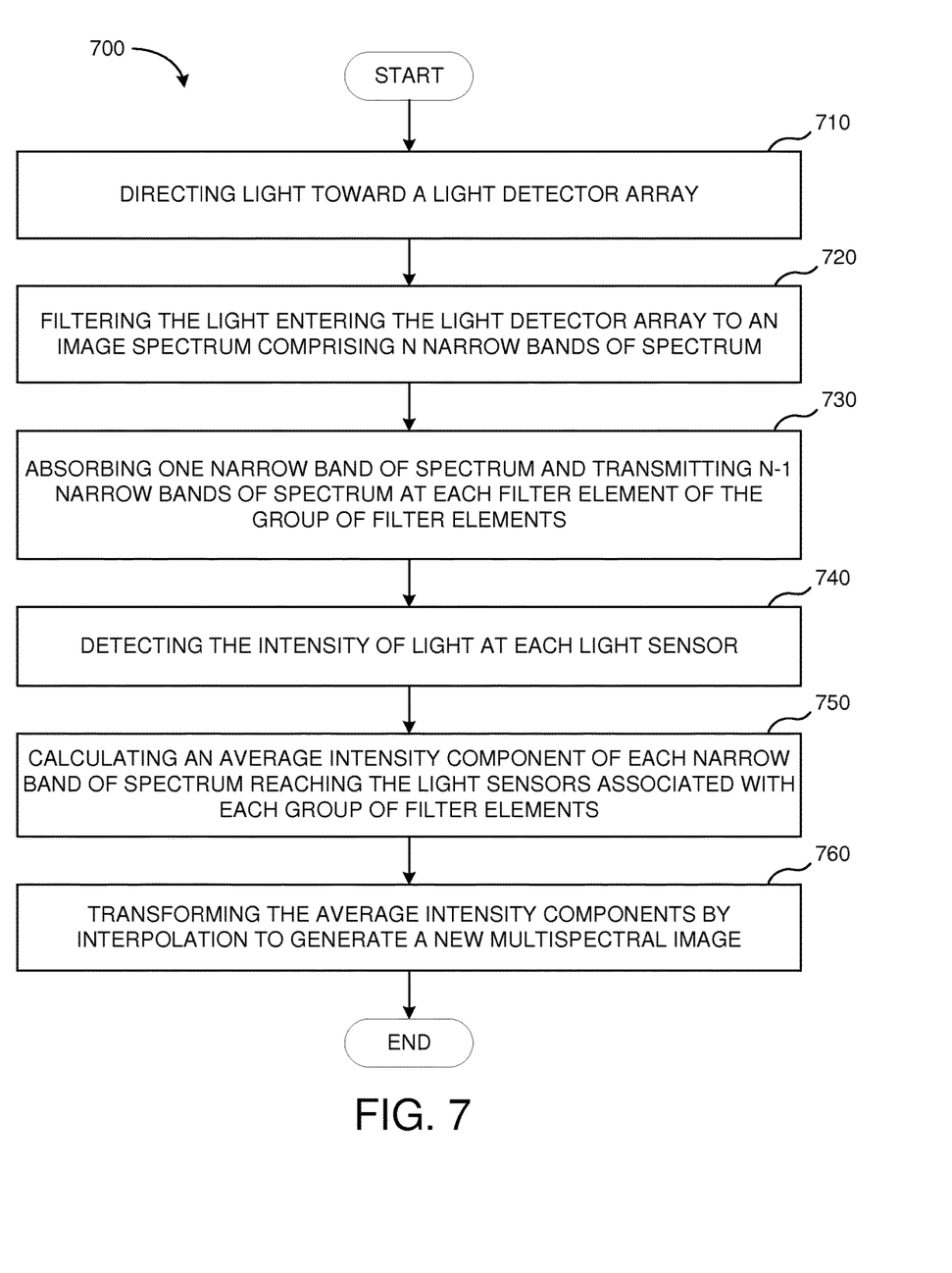
FIG. 7 illustrates an example method for detecting a multispectral image.

FIG. 7 is an example method for detecting a multispectral image. The method 700 may be performed using the multispectral imaging system 100 from FIG. 1. Specifically, instructions stored in the computer-readable memory 160 or storage 170 may be executed by the processor 150 to carry out the steps of the method 700.

At 710, light is directed toward a light-detector array. For example, the focusing system 110 can direct light toward a light-detector array comprising the narrow-band filter array 120 and the pixel array 130. The narrow-band filter array 120 is organized into a plurality of groups of filter elements. Each group of filter elements comprises N filter elements. Each filter element is associated with a light sensor.

At 720, the light entering the light-detector array can be filtered to an image spectrum comprising N different narrow bands of spectrum, N being an integer greater than three. For example, the transmissive filter 210 may be used to bandpass filter the spectrum of light reaching the narrow-band filter array 120 and the pixel array 130.

At 730, one narrow band of spectrum is absorbed and N−1 narrow bands of spectrum are transmitted by each filter element of the group of filter elements of the narrow-band filter array 120. Each filter element of the group absorbs a different narrow band of spectrum so that all N narrow bands of spectrum of the image spectrum are absorbed by the group of filter elements.

At 740, the intensity of light is detected at each light sensor. For example, each light sensor, e.g., pixel, of the pixel array 130 can detect the intensity of light reaching the pixel. The intensity detected by the pixels can be captured with sensing and control electronics 140 and stored in the memory 160 or in the storage 170.

At 750, an average intensity of the respective narrow bands of spectrum reaching the light sensors associated with each group of filter elements is calculated. For example, the average intensity for a narrow-band component of a group of N filter elements can be calculated by solving N equations for N unknowns.

At 760, the average intensity components can be transformed by interpolation to generate a new multispectral image. For example, a linear or non-linear interpolation algorithm, as described with reference to FIG. 6, can be used to convert the average intensity components into a new multispectral image.

As described above, the optical spectrum of interest can be divided into N separate bands. The range of the spectrum of interest can be determined by the sensitivity of the detector and the availability of absorptive filter elements. For example, a standard CCD sensor can have a sensitivity that ranges from about 350 nm to 1000 nm. Since this range includes wavelengths in the ultraviolet, visible, and infrared spectra, the range can be divided into N bands covering the visible and part of the ultraviolet and near infrared spectra. For example, a camera using the CCD sensor can be designed to operate in the ultraviolet and visible during the day and the near-infrared during the evening. In earlier examples (such as in reference to FIGS. 3A, 4, and 5), the spectrum of interest is divided into four narrow bands (e.g., N=4) and each filter absorbs only one band. This configuration corresponds to measuring approximately (N−1)/N of the incident light, assuming that all the bands have approximately the same amount of energy. This configuration can be described as an N−1 filter to indicate that N−1 narrow bands are transmitted through respective filter elements. The basic configuration can be generalized to an N−K filter (e.g., N−K narrow bands are transmitted through each element), where (N−2)≥K≥1, such that the earlier examples correspond to K=1. In other words, K can be an integer between 1 and N−2. The N−2 term indicates that at least two narrow bands are transmitted by each narrow band filter element.

As described above, an N−1 filter element (e.g., K=1) can include a combination of a single color dye of narrow-band absorption spectrum and a transparent polymer. An N−K filter element (e.g., K>1) can include combinations of a transparent polymer and multiple color dyes having different narrow-band absorption spectra. For example, K different dyes can be used to absorb K different narrow-band absorption spectrums. Additionally or alternatively, the filter elements can include an interference-type filter that is realized by using multiple layers of transparent materials of alternating dielectric constants or a cholesteric liquid crystal material. Additionally or alternatively, the filter elements can include one or more of a mixture of color dyes, quantum dots, nano-particles, nanowires, and carbon nanotubes.

Figure 8:
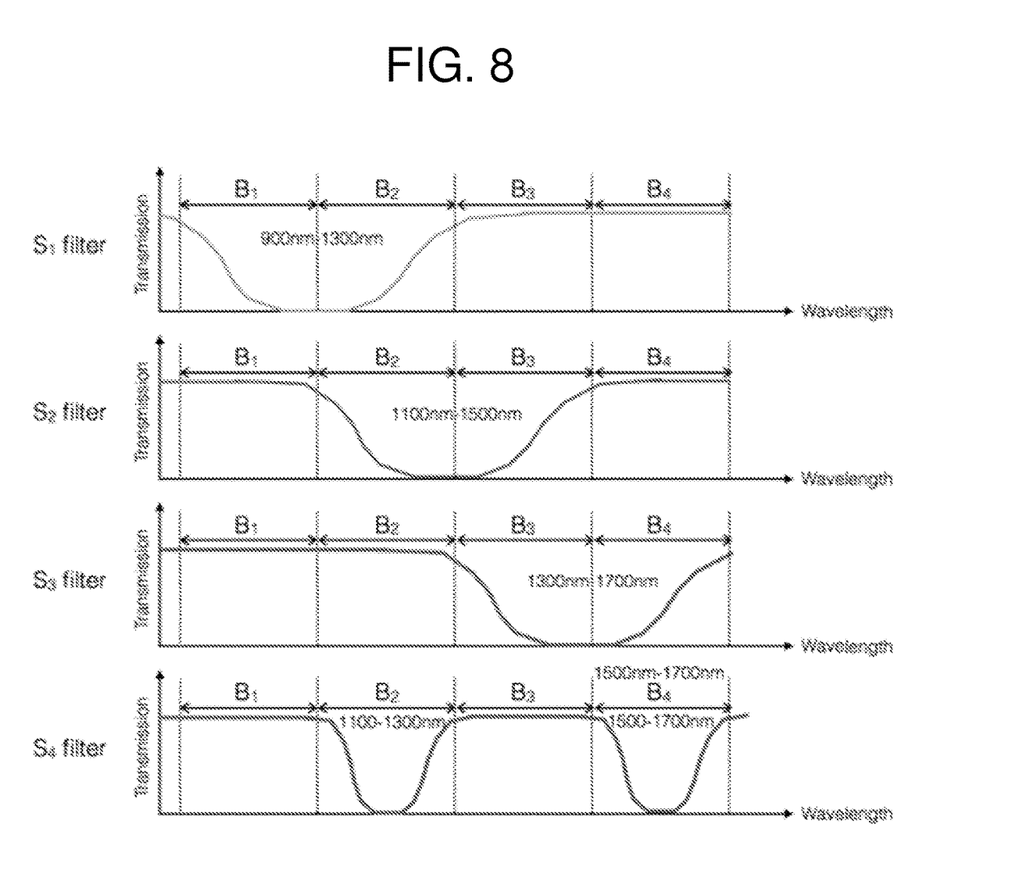
FIG. 8 illustrates an example of the transmission spectrum of filter elements within an N−K narrow-band absorptive filter array.

FIG. 8 illustrates an example of the transmission spectra of filter elements within an N−K narrow-band absorptive filter array, where N=4 and K=2. Thus, the spectrum of interest is divided into four narrow bands, and each of the filter elements absorbs light in two of the narrow bands and transmits light in two of the narrow bands. The absorbed narrow bands of a respective filter element can be adjacent as in $S_1$-$S_3$, or the absorbed narrow bands can be separated by another narrow band as in $S_4$. The energy of individual narrow bands incident on the group of pixels can be calculated by inverting the 4×4 T matrix and solving for $\overline{B}$.

$$\overline{S} = \begin{bmatrix} 0 & 0 & 1 & 1 \\ 1 & 0 & 0 & 1 \\ 1 & 1 & 0 & 0 \\ 1 & 0 & 1 & 0 \end{bmatrix} \overline{B} + n$$

so that $$B_1^{estimate} = \frac{[S_2 + S_4 - S_1]}{2} = B_1 + n\sqrt{\frac{3}{4}}$$

-continued $$B_2^{estimate} = \frac{[S_1 + 2S_3 - S_4 - S_2]}{2} = B_2 + n\sqrt{1.75}$$

$$B_3^{estimate} = \frac{[S_1 - S_2 + S_4]}{2} = B_3 + n\sqrt{\frac{3}{4}}$$

$$B_4^{estimate} = \frac{[S_1 + S_2 - S_4]}{2} = B_4 + n\sqrt{\frac{3}{4}}$$

Alternatively, a different set of dual band filters (e.g., K=2) can be selected so that the matrix is different. Specifically, the narrow bands associated with respective filters can be selected to obtain a desired T matrix. For example:

$$\overline{S} = \begin{bmatrix} 0 & 1 & 0 & 1 \\ 1 & 0 & 0 & 1 \\ 1 & 1 & 0 & 0 \\ 1 & 0 & 1 & 0 \end{bmatrix} \overline{B} + n$$

As the following example illustrates, it may be desirable to adjust the absorption and transmission spectra for respective filter elements to trade off the total light transmitted and the SNR of the narrow-band filter array. In other words, for a given N, the narrow-band filter array with the highest light transmission (e.g., K=1) is not necessarily the narrow-band filter array with the highest SNR. For example, a narrow-band filter array for N=8 and K=1 yields 8 narrow bands with (N−1)/N or 87.5% light transmission within the spectrum of interest. Mathematically, the measurements can be expressed as:

$$\overline{S} = \begin{bmatrix} 0 & 1 & 1 & 1 & 1 & 1 & 1 & 1 \\ 1 & 0 & 1 & 1 & 1 & 1 & 1 & 1 \\ 1 & 1 & 0 & 1 & 1 & 1 & 1 & 1 \\ 1 & 1 & 1 & 0 & 1 & 1 & 1 & 1 \\ 1 & 1 & 1 & 1 & 0 & 1 & 1 & 1 \\ 1 & 1 & 1 & 1 & 1 & 0 & 1 & 1 \\ 1 & 1 & 1 & 1 & 1 & 1 & 0 & 1 \\ 1 & 1 & 1 & 1 & 1 & 1 & 1 & 0 \end{bmatrix} \overline{B} + n.$$

Inverting the 8×8 T matrix and solving for $\overline{B}$ yields an average SNR gain that is 14% higher than the SNR of an overlapping filter design. Note that an overlapping filter design, such as an RGB filter, includes respective filter elements that transmit light in only one band and absorb light in the remaining bands, such that its corresponding transmission matrix includes rows with a single 1 (the transmitted band) and multiple 0's (the absorbed bands). The transmission efficiency of an overlapping filter is about 1/N or 12.5% for N=8.

As another example of a narrow-band filter array for N=8, when K=4 the light transmission efficiency is about (N−K)/N or 50% within the spectrum of interest. Mathematically, the measurements can be expressed as:

$$\overline{S} = \begin{bmatrix} 0 & 1 & 1 & 0 & 1 & 0 & 0 & 1 \\ 1 & 0 & 1 & 0 & 1 & 0 & 1 & 0 \\ 1 & 1 & 0 & 0 & 1 & 1 & 0 & 0 \\ 1 & 0 & 0 & 1 & 1 & 0 & 0 & 1 \\ 1 & 1 & 1 & 1 & 0 & 0 & 0 & 0 \\ 1 & 0 & 1 & 0 & 0 & 1 & 0 & 1 \\ 1 & 1 & 0 & 0 & 0 & 0 & 1 & 1 \\ 1 & 0 & 0 & 1 & 0 & 1 & 1 & 0 \end{bmatrix} \overline{B} + n.$$

Here, inverting the T matrix and solving for $\overline{B}$ yields an average SNR gain that is about 80% higher than the SNR of an overlapping filter design. Thus, the N=8, K=1 design transmits more light than the N=8, K=4 design (87.5% versus 50%), but the N=8, K=4 design has a greater SNR than the N=8, K=1 design.

In the examples above, the narrow-band absorptive filter arrays include filter elements where the number of absorbed narrow bands (e.g., K) is constant for all of the filter elements. However, a narrow-band absorptive filter array can include multiple filter elements, where a first filter element absorbs a first number of narrow bands and a second filter element absorbs a different, second number of narrow bands. In other words, the number of absorption bands, $K_i$, for filter element i (where i varies from 1 to N), can be different from the number of absorption bands, $K_j$, for filter element j (where j varies from 1 to N). The $i^{th}$ row of the transmission matrix, T, corresponding to filter element i will include a 0 for an absorbed band and a 1 for a transmitted band. For example, a narrow-band absorptive filter for N=12 can be designed such that:

$$\overline{S} = \begin{bmatrix} 1 & 1 & 0 & 1 & 1 & 1 & 0 & 0 & 0 & 1 & 0 & 1 \\ 1 & 0 & 1 & 1 & 1 & 0 & 0 & 0 & 1 & 0 & 1 & 1 \\ 0 & 1 & 1 & 1 & 0 & 0 & 0 & 1 & 0 & 1 & 1 & 1 \\ 1 & 1 & 1 & 0 & 0 & 0 & 1 & 0 & 1 & 1 & 0 & 1 \\ 1 & 1 & 0 & 0 & 0 & 1 & 0 & 1 & 1 & 0 & 1 & 1 \\ 1 & 0 & 0 & 0 & 1 & 0 & 1 & 1 & 0 & 1 & 1 & 1 \\ 0 & 0 & 0 & 1 & 0 & 1 & 1 & 0 & 1 & 1 & 1 & 1 \\ 0 & 0 & 1 & 0 & 1 & 1 & 0 & 1 & 1 & 1 & 0 & 1 \\ 0 & 1 & 0 & 1 & 1 & 0 & 1 & 1 & 1 & 0 & 0 & 1 \\ 1 & 0 & 1 & 1 & 0 & 1 & 1 & 1 & 0 & 0 & 0 & 1 \\ 0 & 1 & 1 & 0 & 1 & 1 & 1 & 0 & 0 & 0 & 1 & 1 \\ 1 & 1 & 1 & 1 & 1 & 1 & 1 & 1 & 1 & 1 & 1 & 0 \end{bmatrix} \overline{B} + n$$

Here, $K_1 = K_2 = \ldots = K_{11} = 5$ and $K_{12} = 1$, and the average SNR gain after inverting the measurement for each of the 12 spectral bands is over 300% relative to an overlapping filter design.

By varying $K_i$ within the group of filter elements, the SNR can potentially be increased as compared to keeping $K_i$ constant within the group of filter elements. Finding the optimal combination of absorption and transmission narrow bands in the transmission matrix corresponding to the highest SNR is an NP complete problem. However, for small N, an optimal combination can be discovered by finding an inverse of the transmission matrix for all possible combinations, e.g., by successively calculating the inverse for all possible transmission matrices for a given N. Alternatively, transmission matrices can be randomly or otherwise selected and the inverses can be calculated until an inverse matrix is found that has a SNR greater than a target SNR. The filter elements can be designed according to the resulting transmission matrix. For example, each absorbed narrow band (a 0 in the transmission matrix) can correspond to a color dye and/or an interference-type filter. The filter element can be fabricated by combining color dyes and/or interference patterns in one or more layers of the filter element.

Figure 9:
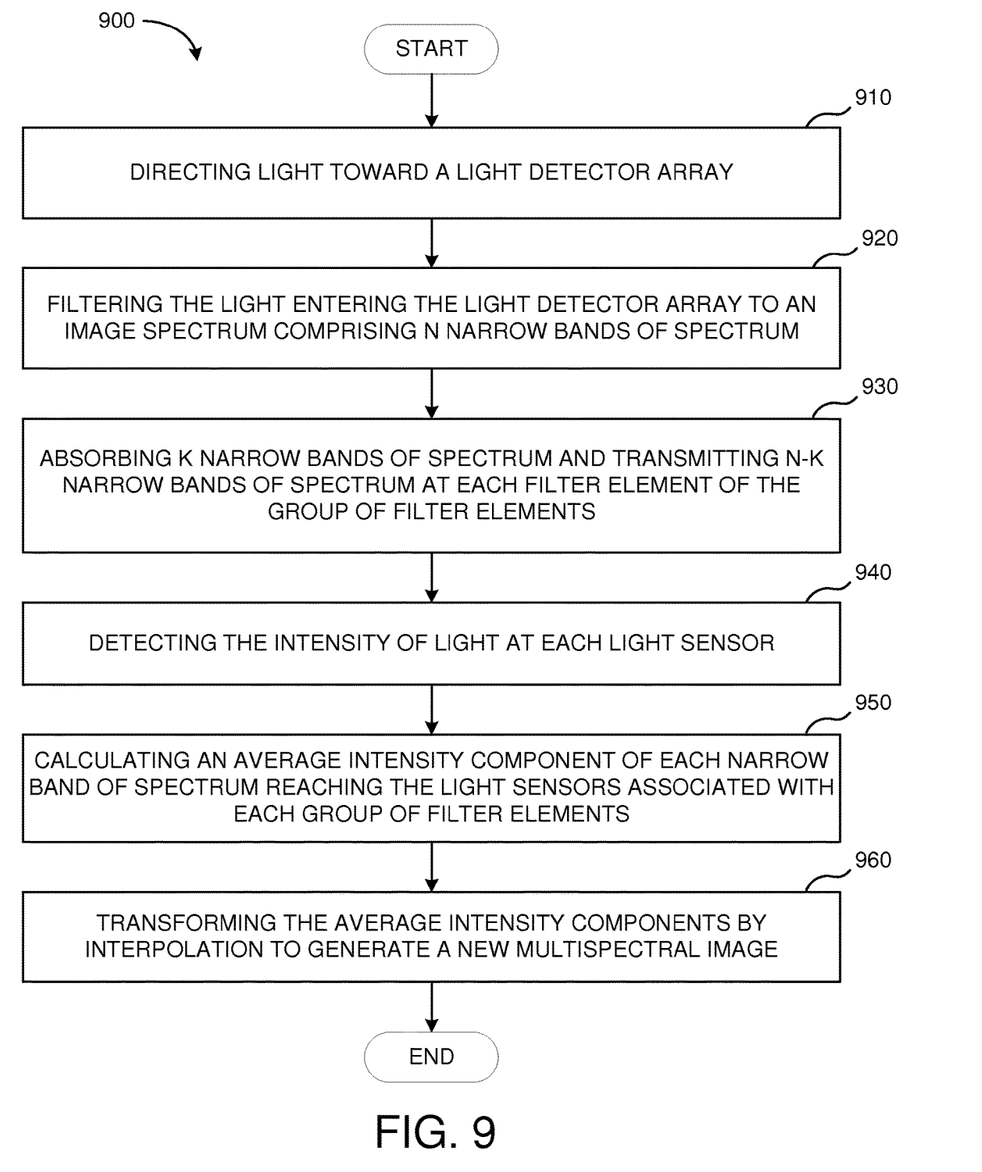
FIG. 9 illustrates an example method for detecting a multispectral image for a multispectral imaging system including an N−K narrow-band absorptive filter array.

FIG. 9 is an example method 900 for detecting a multispectral image using a multispectral imager that includes an N−K narrow-band absorptive filter array. The method 900 may be performed using the multispectral imaging system 100 from FIG. 1.

At 910, light is directed toward a light-detector array. For example, the focusing system 110 can direct light toward a light-detector array comprising the narrow-band filter array 120 and the pixel array 130. The narrow-band filter array 120 is organized into a plurality of groups of filter elements. Each group of filter elements comprises N filter elements. Each filter element is associated with a light sensor.

At 920, the light entering the light-detector array can be filtered to an image spectrum comprising N different narrow bands of spectrum, N being an integer greater than three. For example, the transmissive filter 210 may be used to bandpass filter the spectrum of light reaching the narrow-band filter array 120 and the pixel array 130.

At 930, K narrow bands of spectrum are absorbed and N−K narrow bands of spectrum are transmitted by each filter element of the group of filter elements of the narrow-band filter array 120. Each filter element of the group absorbs a different combination of narrow bands of spectra. In one embodiment, each filter element of the group has the same value of K and K varies from one to N−2. In an alternative embodiment, different filter elements of the group have different respective values for K, and K varies from one to N−1. Specifically, a first filter element can absorb a first number of narrow bands and a second filter element can absorb a second number of narrow bands. In other words, the number of absorption bands, $K_i$, for filter element i (where i varies from 1 to N), can be different from the number of absorption bands, $K_j$, for filter element j (where j varies from 1 to N). All N narrow bands of spectrum of the image spectrum are absorbed by the group of filter elements.

At 940, the intensity of light is detected at each light sensor. For example, each light sensor, e.g., pixel, of the pixel array 130 can detect the intensity of light reaching the pixel. The intensity detected by the pixels can be captured with sensing and control electronics 140 and stored in the memory 160 or in the storage 170.

At 950, an average intensity of the respective narrow bands of spectrum reaching the light sensors associated with each group of filter elements is calculated. For example, the average intensity for a narrow-band component of a group of N filter elements can be calculated by solving N equations for N unknowns (e.g., inverting the transmission matrix and solving for $\overline{B}$).

At 960, the average intensity components can be transformed by interpolation to generate a new multispectral image. For example, a linear or non-linear interpolation algorithm, as described with reference to FIG. 6, can be used to convert the average intensity components into a new multispectral image.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A multispectral imager for sensing a multispectral image, comprising:
 a light sensor array comprising a plurality of pixels; and
 a filter array situated upstream of the light sensor array, the filter array comprising a plurality of narrow-band absorptive filter elements in which individual filter elements are associated with respective individual pixels of the light sensor array, the plurality of filter elements being organized into groups each comprising respective N filter elements, in which individual filter element i absorbs $K_i$ respective narrow bands and transmits $N-K_i$ narrow bands of incident light, wherein the group of N filter elements absorbs the N narrow bands, N is greater than three, $K_i$ is between 1 and N−1, i is from 1 to N, and $K_i$ is different for at least two individual filter elements.

2. The imager of claim 1, wherein respective absorption peaks of the N filter elements are within a range of 900 nanometers to 1700 nanometers.

3. The imager of claim 1, wherein at least one absorption peak of the N filter elements is within a visible spectrum.

4. The imager of claim 1, wherein at least one absorption peak of the N filter elements is within an ultraviolet spectrum.

5. The imager of claim 1, wherein at least one absorption peak of the N filter elements is within an infrared spectrum.

6. The imager of claim 1, wherein one or more of the N filter elements includes an interference-type filter.

7. The imager of claim 1, wherein one or more of the N filter elements includes a color dye in a polymer matrix.

8. The imager of claim 1, wherein the group of N filter elements comprises a first and a second filter element, the first filter element including a color dye in a polymer matrix, and the second filter element including an interference-type filter.

9. A method for detecting a multispectral image, comprising:
 directing light toward an array of filter elements and an array of light sensors, the array of filter elements being organized into a plurality of groups of filter elements, each group of filter elements comprising respective N filter elements in which individual filter elements are associated with a respective light sensor of the array of light sensors;
 filtering the light entering the array of light sensors to an image spectrum comprising N narrow bands of spectra, N being greater than three;
 at individual filter elements, absorbing one respective narrow band of the spectrum and transmitting N−1 respective narrow bands of the spectrum such that the group of filter elements absorbs respective N narrow bands of the image spectrum; and
 detecting respective intensity of light received at each light sensor.

10. The method of claim 9, wherein an overlap integral for the absorbed narrow bands of any two filter elements of the group of N filter elements is less than 0.1.

11. The method of claim 9, wherein an overlap integral for the absorbed narrow bands of any two filter elements of the group of N filter elements is less than 0.2.

12. The method of claim 9, wherein:
 a respective absorption peak of each of the N filter elements is within a spectrum of interest; and
 a sum of full widths at half maxima for the N filter elements is less than a range of the spectrum of interest.

13. The method of claim 12, wherein the N narrow bands corresponding to the full widths at half maxima for the respective N filter elements are non-overlapping.

14. The method of claim 9, further comprising calculating, using an interpolation algorithm, intensity of respective narrow bands of spectra reaching the light sensors associated with the groups of filter elements.

15. A camera for capturing a multispectral image, comprising:
 a focusing system situated and configured to produce a focused image from light incident to the focusing system;
 a light sensor array comprising a plurality of light-sensitive pixels; and
 a filter array situated between the focusing system and the light sensor array, the filter array comprising a plurality of narrow-band absorptive filter elements in which individual filter elements are associated with respective individual pixels of the light sensor array, the plurality of filter elements being organized into groups comprising respective N filter elements, in which individual filter elements absorb K respective narrow bands and transmit N−K narrow bands of incident light, the group of N filter elements absorbing all N narrow bands, wherein N is greater than three and K is between one and N−2.

16. The camera of claim 15, wherein the group of N filter elements includes a first filter element that absorbs a first number of narrow bands and a second element that absorbs a second number of narrow bands.

17. The camera of claim 15, wherein respective absorption peaks of the N filter elements include at least one absorption peak within a visible spectrum and at least one absorption peak within an infrared spectrum.

18. The camera of claim 15, wherein respective absorption peaks of the N filter elements include at least one absorption peak within an ultraviolet spectrum.

19. The camera of claim 15, wherein each of the N narrow bands corresponding to the full widths at half maxima for the respective N filter elements is less than 2/N of a spectrum of interest.

20. The camera of claim 15, wherein the group of N filter elements comprises a first filter element including a color dye in a polymer matrix and a second filter element including an interference-type filter.

* * * * *